June 1, 1954     H. O. H. DÖLZ     2,679,732
SMALL ELECTRIC REFRIGERATING MACHINE
Filed Jan. 12, 1951
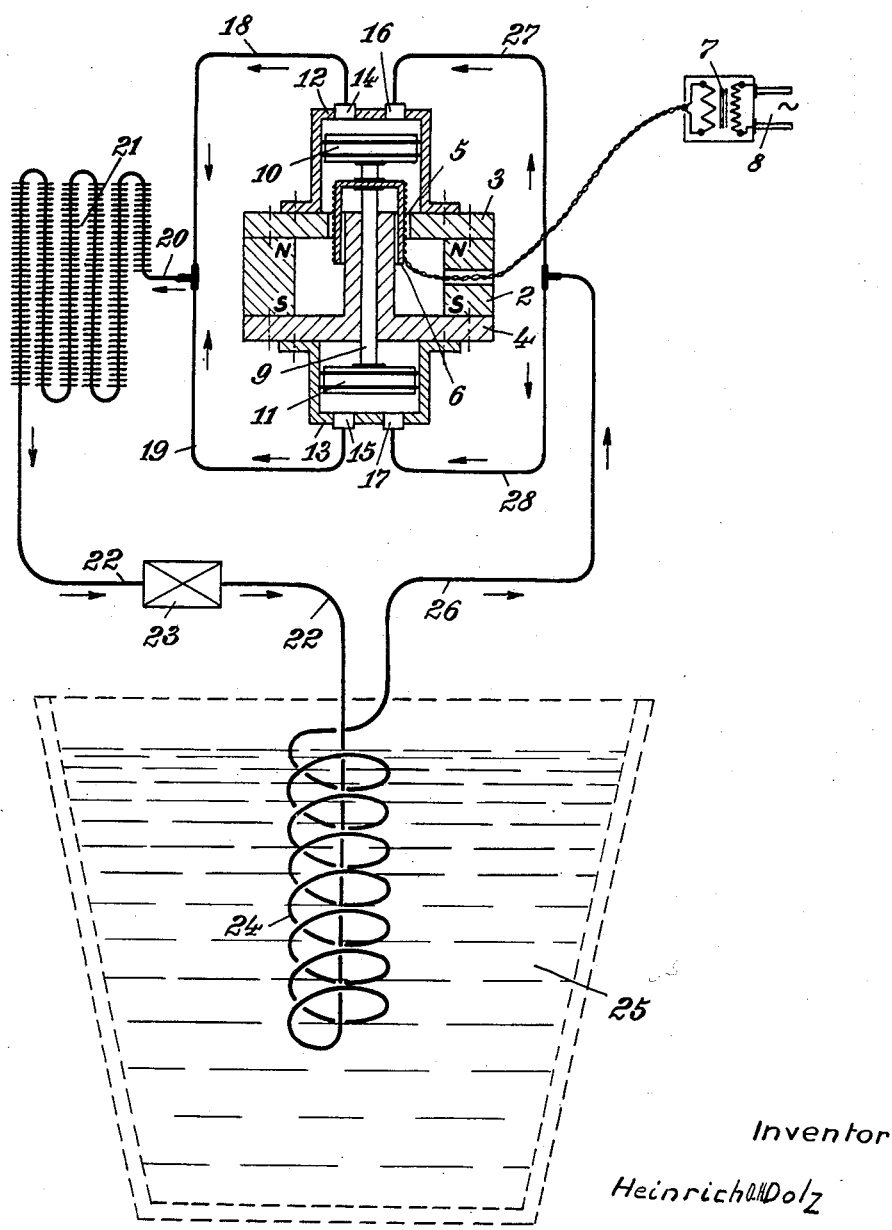
Inventor
Heinrich O. H. Dolz
by
Attorneys Patented June 1, 1954

2,679,732

UNITED STATES PATENT OFFICE 2,679,732

SMALL ELECTRIC REFRIGERATING MACHINE

Heinrich Otto Herrmann Dölz, Pforzheim, Germany

Application January 12, 1951, Serial No. 205,808

1 Claim. (Cl. 62—115)

This invention relates to apparatus for transmitting reciprocatory motion from a source of electrical power to small machines, especially small refrigerators.

It is common practice to drive piston-mechanism by means of electric motors. The same method has been followed even with small types of piston mechanism such as are used in small refrigerating machines, for example, immersion coolers, which in external construction resemble an electric immersion heater, but cool a liquid instead of heating it.

As it is often not easy to transform the rotary motion of the motor into reciprocating motion of the piston in a reliable manner, when, as in an immersion cooler—to keep to this example—dimensions are small, an attempt has been made to effect the electrical drive by means of an iron core which is drawn into a magnetic coil as soon as current is passed through the coil. When the current is broken, a restoring spring withdraws the iron core from the coil. If the coil is excited with 50 cycles per second alternating current, the iron core makes 100 reciprocating movements per second. This method of driving has the disadvantage that the limitation of the stroke by damping devices, for example rubber buffers or air cushions, consumes a great deal of energy on account of the comparatively large mass of the iron core. The drive is very vigorous and the vibrations are transmitted over the whole apparatus in an unpleasant manner.

Both methods of driving smaller types of piston mechanism, that is by electric motors or by an iron core which is drawn at regular intervals into a magnetic coil in opposition to a restoring spring, share a fundamental drawback, namely the low degree of efficiency.

Smaller types of electric motors of a mechanical power of a few watts have an efficiency of hardly more than 10%. The same applies to drive by means of an iron core with periodic movement, the low efficiency of which is due essentially to the unfavourable ratio of air gap to iron path. Only when the iron core is in the "attracted" position is the air gap small. Further, in order to achieve satisfactory efficiency the resonant frequency of the iron core—restoring spring system would have to lie above 100 cycles per second, which, in view of the relatively large mass of the core, would demand a powerful restoring spring; but only a small fraction of the force that must be exerted in order to overcome the spring is recovered when the tension of the spring is relaxed, so that in spite of this measure it is extremely unlikely that an efficiency of more than 10% would be attained.

Efforts to produce immersion coolers have hitherto failed because an attempt was made to drive the small refrigerator built into the immersion cooler by methods of low efficiency; for with a drive efficiency of only 10%, 90% of the electrical energy expended must be dissipated as heat into the surrounding air. Besides this, there is the heat lost by the condenser and that withdrawn from the medium to be cooled. The interchange of heat with the air would thus reach dimensions out of all proportion to the dimensions of the immersion cooler. The successful production of an immersion cooler depends therefore essentially on a considerable degree of efficiency in the drive.

An object of the present invention is to provide an efficient electrical drive for the transmission of reciprocating motion to small machines, especially small refrigerators.

A further object is to provide a double-acting reciprocating pump with an efficient electrical drive.

Yet another object is to provide a small electrically-driven refrigerating apparatus of low power consumption and high efficiency.

In accordance with the present invention there is provided apparatus for transmitting reciprocatory motion to small machines, especially small refrigerators, which apparatus shows a very high efficiency in comparison with small drive units known heretofore. The apparatus of the present invention is constructed almost exactly in the same way as the power units of dynamic loudspeakers in which the magnet is either permanent or electrically energised. The driving unit on which the present invention is based comprises a permanent pot-shaped magnet with an annular gap or clearance in which a coil can reciprocate freely. As the coil contains no iron, it is extraordinarily light. Copper windings, through which a 50 cycles per second alternating current is passed, are wound on to the coil bobbin. The restoring spring connected with the coil may be very weak as its chief function is to maintain the coil in a definite mid-position. At the same time it serves to centre the coil in the annular clearance to prevent the coil from grazing the wall surrounding the clearance. The coil is directly connected to the piston of the small refrigerator. Centering of the coil may be effected alternatively by means of the piston, which must of course fit neatly into the cylinder.

If the natural resonance of the whole system (coil+piston+restoring spring+spring effect of the compressed air in the condenser) is brought close to the exciting frequency, that is generally about 50 cycles per second, efficiencies of 60% and more are attained with this mode of drive. As is well known, dynamic loud-speakers have efficiencies of 50% and more near their natural resonances. As compared with the loud-speaker, however, the medium to which power is to be transmitted can be considerably more favourably adapted to the power unit so that the estimated efficiency of 60% is probably too low rather than too high.

The coil drive is not only applicable to the transmission of reciprocatory movements to small types of piston mechanism, but it is also advantageous for installations of larger size, as its use eliminates the necessity of converting rotary motion into reciprocatory motion. It is applicable whenever reciprocatory movements are to be effected with efficiency, that is, it is not confined to the driving of piston mechanism.

A refrigerating apparatus is shown diagrammatically, by way of example, in the accompanying drawing.

Referring to the drawing, there is provided a ring magnet 2 of magnetic material of great coercive force, for example oerstedite. The letters N and S indicate the polarity of the magnet 2. Pole shoes 3 and 4 of soft iron close the magnetic circuit in such a way that an annular clearance 5 remains free. The parts 2 to 5 together form a pot-shaped magnet with an annular clearance.

A bobbin carrying a coil 6 is freely mounted in the clearance 5. The copper windings of the coil are connected up with the secondary winding of an intermediate transformer 7. The primary winding of the transformer 7 leads to the pins 8 of a plug which can be fitted into a light socket. The transformer 7 reduces the mains voltage, which is generally in the region of 220 to 250 volts, to about 4 to 6 volts. With an advantageous width of annular clearance, the winding of the moving coil cannot be made highly resistant to an unlimited degree, and the voltage must be reduced by means of an intermediate transformer. As shown in the drawing, the latter can be combined with the plug in the single unit. Alternatively, the transformer may be accommodated in a special box provided in the supply cable between the plug and the moving coil. The parts 2 to 8 together represent the coil drive which can be used to drive a small refrigerator.

A small refrigerator is shown in the drawing. The immersion coil bobbin is joined with the piston-rod 9, to which two pump or compressor pistons 10 and 11 are attached. The piston-rod is advantageously led through the pole-shoe 4 and the immersion coil 6. In this way a double-acting pump or compressor is obtained without the necessity of leading the piston-rod through stuffing boxes. Cylinders 12 and 13, excess pressure valves 14 and 15, and suction valves 16 and 17 complete the double-acting compressor. The cylinders are connected by piping (18, 19 and 20) with the condenser 21, in which the compressed freezing medium is liquefied, with loss of heat to the air. From the constructional point of view the condenser 21 may be wound in a spiral round the pot-shaped magnet of the immersion coil-drive and the other constructional units. From the condenser 21 the piping 22 leads via a throttle valve 23 to an evaporator 24, where the freezing medium again evaporates and in so doing withdraws heat from the liquid 25 which is to be cooled (shown in dotted lines in the drawing). The freezing medium evaporated in the evaporator 24 is finally sucked in through the piping 26, 27 and 28 by the double-acting compressor, compressed and restored to circulation. The arrows alongside the piping indicate the direction of circulation of the freezing medium.

The refrigerator shown in the drawing is an ordinary evaporation refrigerator, which generally uses ammonia as a freezing medium. Instead of the throttle valve, the decrease in pressure of the freezing medium could of course also have been carried out with the recovery of energy (expansion). There is not much advantage in this, however, and it necessitates, moreover, two further expansion pistons and stuffing boxes, if the reverse ends of the compressor pistons are to be used as expansion pistons. Even with refrigerators of considerable size the recovery of this energy is not nowadays attempted.

I claim:

A refrigerator apparatus comprising a ring magnet having an annular clearance formed therein, an immersion coil movable in said clearance, means supplying alternating current to said coil, a piston rod firmly connected with said coil and having ends extending on opposite sides of said ring magnet, said annular clearance being coaxial with said piston rod, a separate piston mounted upon each end of the rod, a separate cylinder enclosing each piston and connected to said magnet, said pistons being spaced inwardly from said cylinders, each of said cylinders having separate excess pressure and suction valves, a pipe interconnecting the excess pressure valves of the cylinders, another pipe interconnecting the suction valves of the cylinders, a condenser connected with one of said pipes, a throttle valve connected with the condenser, an evaporator connected with the throttle valve, and a conduit connected with said condenser and the second one of said pipes.

References Cited in the file of this patent

UNITED STATES PATENTS

| Number | Name | Date |
| --- | --- | --- |
| 1,493,259 | Green | May 6, 1924 |
| 1,653,885 | Guilder | Dec. 27, 1927 |
| 1,780,335 | Canton | Nov. 4, 1930 |
| 1,844,772 | La Pointe | Feb. 9, 1932 |
| 1,934,994 | Nahman et al. | Nov. 14, 1933 |
| 2,061,869 | Gilbert et al. | Nov. 24, 1936 |
| 2,194,535 | Von Delden | Mar. 26, 1940 |
| 2,257,862 | Sarver | Oct. 7, 1941 |